(12) United States Patent
Tomatsu et al.

(10) Patent No.: US 10,108,190 B2
(45) Date of Patent: Oct. 23, 2018

(54) AUTONOMOUS DRIVING APPARATUS

(71) Applicant: Toyota Jidosha Kabushiki Kaisha, Toyota-shi, Aichi-ken (JP)

(72) Inventors: Nobuyuki Tomatsu, Toyota (JP); Ikuma Suzuki, Okazaki (JP); Kentaro Ichikawa, Shizuoka-ken (JP); Junya Watanabe, Shizuoka-ken (JP); Bunyo Okumura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 95 days.

(21) Appl. No.: 15/404,686

(22) Filed: Jan. 12, 2017

(65) Prior Publication Data

US 2017/0248954 A1   Aug. 31, 2017

(30) Foreign Application Priority Data

Feb. 25, 2016   (JP) ................................ 2016-034364

(51) Int. Cl.
*G05D 1/00* (2006.01)
*B60W 40/08* (2012.01)

(52) U.S. Cl.
CPC .......... *G05D 1/0061* (2013.01); *B60W 40/08* (2013.01); *G05D 1/0088* (2013.01); *B60W 2540/00* (2013.01)

(58) Field of Classification Search
CPC ... G05D 1/0061; G05D 1/0088; B60W 40/08; B60W 2540/00
See application file for complete search history.

(56) References Cited

U.S. PATENT DOCUMENTS

| 2014/0156133 A1* | 6/2014 | Cullinane ............. B60W 30/00 701/23 |
| 2016/0209841 A1 | 7/2016 | Yamaoka et al. |
| 2018/0157256 A1* | 6/2018 | Oniwa ................. G05D 1/0061 |

FOREIGN PATENT DOCUMENTS

| JP | 2012051441 A | 3/2012 |
| JP | 2015168369 A | 9/2015 |
| JP | 2015-230552 A | 12/2015 |
| JP | 2016133985 A | 7/2016 |
| WO | 2015159341 A1 | 10/2015 |

* cited by examiner

Primary Examiner — Aaron L Troost
(74) Attorney, Agent, or Firm — Dinsmore & Shohl LLP (57) ABSTRACT

An autonomous driving apparatus executes an autonomous driving control of a vehicle. When an override occurs during the autonomous driving control, switching from the autonomous driving control to manual driving is executed. A first determination condition is for determining that the autonomous driving control can be resumed, when the driver is estimated to have a continued operation intention, which is an intention to continue the manual driving, after the switching from the autonomous driving control to the manual driving is executed. A second determination condition is for determining that the autonomous driving control can be resumed, when the driver is estimated not to have the continued operation intention after the switching from the autonomous driving control to the manual driving is executed. The first determination condition is less likely to be met than the second determination condition.

2 Claims, 4 Drawing Sheets

AUTONOMOUS DRIVING APPARATUS

CROSS-REFERENCE TO RELATED APPLICATIONS

This application claims priority to Japanese Patent Application No. 2016-034364 filed on Feb. 25, 2016, the entire contents of which are hereby incorporated by reference

BACKGROUND

Technical Field

The present disclosure relates to an autonomous driving apparatus.

Background Art

An autonomous driving apparatus that executes an autonomous driving control of a vehicle is conventionally known. An example of such the autonomous driving apparatus is described in Patent Literature 1.

According to the autonomous driving apparatus described in Patent Literature 1, when the autonomous driving control is executed, the vehicle is controlled based on a target track generated by a target track generation device. Moreover, when a driving operation (override) by a driver is detected during the autonomous driving control, switching from the autonomous driving control to manual driving is executed.

Furthermore, according to the autonomous driving apparatus described in Patent Literature 1, the autonomous driving control is resumed when the following conditions are met after the override is detected and the switching from the autonomous driving control to the manual driving is executed; that is, when the override is not detected and when a state where a difference between an actual track of the vehicle and the target track generated by the target track generation device is less than a threshold continues for a certain period of time.

LIST OF RELATED ART

Patent Literature 1: JP 2012-051441 A

SUMMARY

In the autonomous driving apparatus described in Patent Literature 1, whether or not a driver has an intention to continue the manual driving is not taken into consideration when determining whether or not the autonomous driving control can be resumed, although the difference between the actual track of the vehicle and the target track generated by the target track generation device is taken into consideration. Therefore, in the case of the autonomous driving apparatus described in Patent Literature 1, even though the driver has an intention to continue the manual driving after the override is detected and the switching from the autonomous driving control to the manual driving is executed, the autonomous driving control may be resumed contrary to the driver's intention, which is a problem.

The present disclosure has been made to solve the problem described above. An object of the present disclosure is to provide an autonomous driving apparatus that can suppress the possibility that the autonomous driving control is resumed contrary to the driver's intention after the switching from the autonomous driving control to the manual driving is executed.

In an aspect of the present disclosure, an autonomous driving apparatus that executes an autonomous driving control of a vehicle is provided. The autonomous driving apparatus includes a controller configure to: determine whether or not an override occurs during the autonomous driving control, the override being defined as a condition that an operation amount of a driving operation by a driver becomes equal to or more than a first threshold, execute, when the override is determined to occur, switching from the autonomous driving control to manual driving, estimate whether or not the driver has a continued operation intention that is an intention to continue the manual driving, and manage a determination condition used for determining whether or not the autonomous driving control can be resumed after the manual driving continues for a certain period of time after the operation amount of the driving operation by the driver becomes less than the first threshold. A first determination condition is the determination condition for determining that the autonomous driving control can be resumed, when the driver is estimated to have the continued operation intention after the switching from the autonomous driving control to the manual driving is executed. A second determination condition is the determination condition for determining that the autonomous driving control can be resumed, when the driver is estimated not to have the continued operation intention after the switching from the autonomous driving control to the manual driving is executed. The first determination condition is less likely to be met than the second determination condition.

In other words, according to the autonomous driving apparatus of the present disclosure, the first determination condition for determining that the autonomous driving control can be resumed when the driver is estimated to have the continued operation intention is set to be tighter than the second determination condition for determining that the autonomous driving control can be resumed when the driver is estimated not to have the continued operation intention. That is, according to the autonomous driving apparatus of the present disclosure, after the override is determined to occur and the switching from the autonomous driving control to the manual driving is executed, the autonomous driving control is less likely to be resumed in the case where the driver is estimated to have the continued operation intention than in the case where the driver is estimated not to have the continued operation intention. Thus, according to the autonomous driving apparatus of the present disclosure, it is possible to suppress the possibility that the autonomous driving control is resumed contrary to the driver's intention after the switching from the autonomous driving control to the manual driving is executed.

Dedicated researches conducted by the inventors of the present application have revealed that a steering wheel grip strength of the driver tends to be larger and a period when the steering wheel grip strength of the driver is large tends to be longer in the case where the driver has the continued operation intention than in the case where the driver does not have the continued operation intention.

In view of this point, the autonomous driving apparatus according to the present disclosure may further include a driver status detection unit configured to detect the steering wheel grip strength of the driver. In this case, when a state where the steering wheel grip strength of the driver detected by the driver status detection unit is equal to or more than a second threshold continues for a period equal to or more than a third threshold, the controller may estimate that the driver has the continued operation intention.

That is, according to the autonomous driving apparatus of the present disclosure, the driver is estimated not to have the continued operation intention, for example, when the driver grips a steering wheel but the steering wheel grip strength of the driver is small or when a period when the driver grips the steering wheel is short. In other words, in the case of the autonomous driving apparatus according to the present disclosure, it is possible to more precisely estimate whether or not the driver has the continued operation intention, as compared with a case where whether or not the driver has the continued operation intention is estimated without considering the steering wheel grip strength of the driver and the period when the driver grips the steering wheel.

According to the present disclosure, it is possible to suppress the possibility that the autonomous driving control is resumed contrary to the driver's intention after the switching from the autonomous driving control to the manual driving is executed.

EMBODIMENTS

First Embodiment

Figure 1:
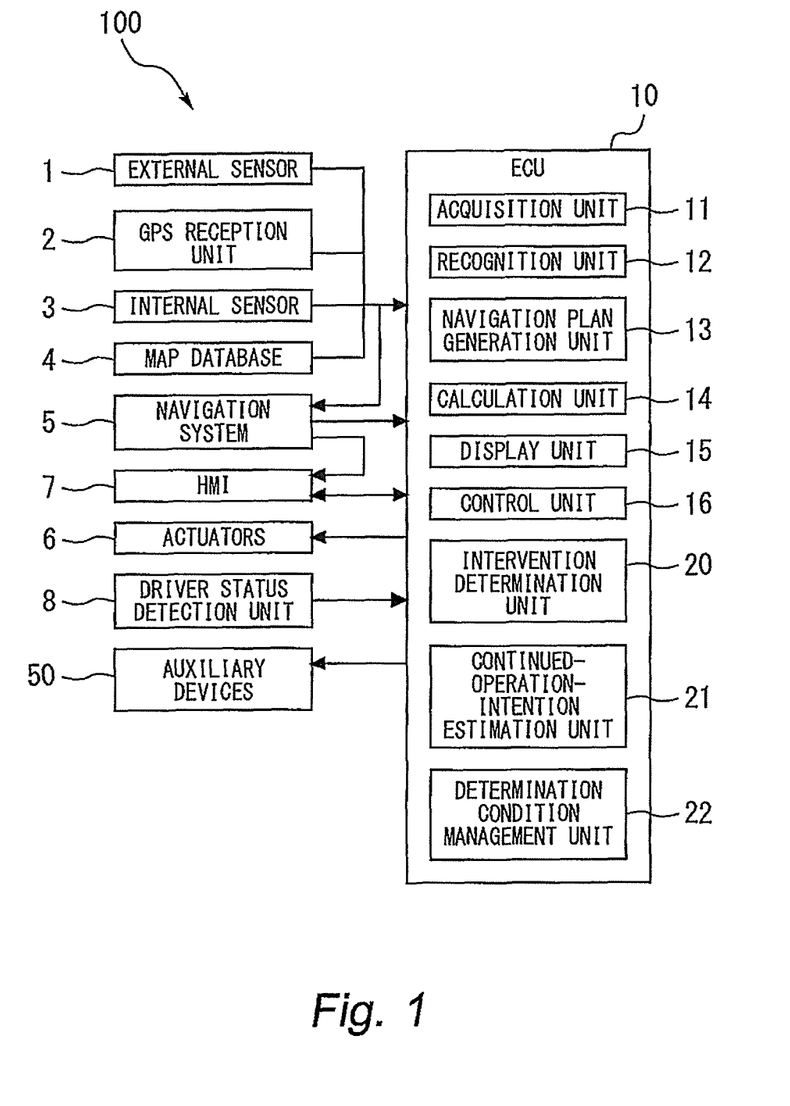
FIG. 1 is a schematic configuration diagram of an autonomous driving apparatus according to a first embodiment.

A first embodiment of an autonomous driving apparatus according to the present disclosure will be described hereinafter. FIG. 1 is a schematic configuration diagram of the autonomous driving apparatus according to the first embodiment.

In the example shown in FIG. 1, the autonomous driving apparatus 100 is installed in a vehicle (not shown) such as a passenger car. The autonomous driving apparatus 100 executes an autonomous driving control of the vehicle. Here, the autonomous driving control means a control that executes driving operations such as acceleration, deceleration and steering of the vehicle without depending on driving operations by a driver of the vehicle. The autonomous driving control includes a lane keeping assist control as an example. In the lane keeping assist control, a steering wheel (not shown) is steered automatically (namely, without depending on a steering operation by the driver) such that the vehicle does not depart from a running lane. That is, in the lane keeping assist control, the steering wheel is automatically steered such that the vehicle runs along the running lane, even when the driver does not perform any steering operation. The autonomous driving control includes a navigation control as another example. In the navigation control, when there is no preceding vehicle in front of the vehicle, a constant speed control to make the vehicle run at a predetermined constant speed is executed. When there is a preceding vehicle in front of the vehicle, a follow-up control to adjust a vehicle speed according to a distance between the vehicle and the preceding vehicle is executed.

According to the present embodiment, switching from the autonomous driving control to manual driving is executed. Whether or not to execute the switching from the autonomous driving control to the manual driving is determined based on a comparison between a comparison target and a threshold. Here, the comparison target is quantified so as to be compared with the threshold. When the comparison target is equal to or more than the threshold, the autonomous driving apparatus 100 executes the switching from the running autonomous driving control to the manual driving. For example, the comparison target is an operation amount of a driving operation (any of a steering operation, an acceleration operation, and a brake operation) by the driver of the vehicle during the autonomous driving control. When the operation amount as the comparison target becomes equal to or more than a first threshold, an intervention determination unit 20 of the autonomous driving apparatus 100 determines that an override occurs and a control unit 16 of the autonomous driving apparatus 100 executes the switching from the running autonomous driving control to the manual driving.

The manual driving is a driving status that makes the vehicle run in accordance mainly with a driving operation by the driver. For example, the manual driving includes a driving status that makes the vehicle run in accordance only with a driving operation by the driver. Moreover, the manual driving includes a driving status in which the vehicle runs in accordance mainly with a driving operation by the driver while a driving operation support control that supports the driving operation by the driver is additionally performed. An example of the driving operation support control performed during the manual driving is as follows. The driver actively performs any of a steering operation, an acceleration operation, and a brake operation of the vehicle, while the autonomous driving apparatus 100 performs any of the steering operation, the acceleration operation, and the brake operation of the vehicle that is not performed by the driver.

In the example shown in FIG. 1, the autonomous driving apparatus 100 is provided with an external sensor 1, an GPS (Global Positioning System) reception unit 2, an internal sensor 3, a map database 4, a navigation system 5, actuators 6, an HMI (Human Machine Interface) 7, a driver status detection unit 8, auxiliary devices 50, and an ECU (Electronic Control Unit) 10.

In the example shown in FIG. 1, the external sensor 1 is a detector that detects external circumstances as surrounding information of the vehicle. The external sensor 1 includes at least one of a camera, a radar, and a LIDAR (Laser Imaging Detection and Ranging).

The camera is an imaging device that images the external circumstances surrounding the vehicle. For example, the camera is provided on a back side of a front windshield of the vehicle. The camera may be a monocular camera or a stereo camera. For example, the stereo camera has two imaging units arranged to recreate binocular disparity. Image information obtained by the stereo camera includes information in a depth direction. The camera outputs, to the ECU 10, image information on the external circumstances surrounding the vehicle. The camera is not limited to a visible camera but can be an infrared camera.

The radar uses radio waves to detect obstacles outside of the vehicle. For example, the radio wave is millimeter wave. The radar transmits the radio waves to the surroundings of the vehicle and receives reflected radio waves from an obstacle to detect the obstacle. For example, the radar can detect, as obstacle information regarding the obstacle, a distance to the obstacle or a direction toward the obstacle. The radar outputs the detected obstacle information to the ECU 10. When performing a sensor fusion, the radar may output, to the ECU 10, reception information of the reflected radio waves.

The LIDAR uses lights to detect obstacles outside of the vehicle. The LIDAR transmits a light to the surroundings of the vehicle and receives reflected light from an obstacle to measure a distance to the reflected point and detect the obstacle. For example, the LIDAR can detect, as obstacle information regarding the obstacle, a distance to the obstacle or a direction toward the obstacle. The LIDAR outputs the detected obstacle information to the ECU 10. When performing a sensor fusion, the LIDAR may output, to the ECU 10, reception information of the reflected lights. Note that the camera, the radar, and the LIDAR do not necessarily need to be used redundantly.

In the example shown in FIG. 1, the GPS reception unit 2 receives signals from three or more GPS satellites to obtain position information indicating a position of the vehicle. For example, the position information includes latitude information and longitude information. The GPS reception unit 2 outputs the measured position information of the vehicle to the ECU 10. As another example, another means for identifying a latitude and a longitude of a position of the vehicle may be used instead of the GPS reception unit 2.

In the example shown in FIG. 1, the internal sensor 3 is a detector for detecting information depending on a running status of the vehicle and an operation amount of any of a steering operation, an acceleration operation, and a brake operation by the driver of the vehicle. The internal sensor 3 includes at least one of a vehicle speed sensor, an acceleration sensor, and a yaw rate sensor for detecting the information depending on the running status of the vehicle. Moreover, the internal sensor 3 includes at least one of a steering sensor, an accelerator pedal sensor, and a brake pedal sensor for detecting the operation amount. In the example shown in FIG. 1, the internal sensor 3 serves as a driving operation detection unit.

The vehicle speed sensor is a detector that detects a speed of the vehicle. For example, a wheel speed sensor is used as the vehicle speed sensor. The wheel speed sensor is provided to a wheel of the vehicle or a drive shaft rotating together with the wheel and detects a rotational speed of the wheel. The vehicle speed sensor outputs, to the ECU 10, vehicle speed information (wheel speed information) including the speed of the vehicle.

The acceleration sensor is a detector that detects an acceleration of the vehicle. For example, the acceleration sensor includes a longitudinal acceleration sensor for detecting a longitudinal acceleration of the vehicle and a lateral acceleration sensor for detecting a lateral acceleration of the vehicle. The acceleration sensor outputs, to the ECU 10, acceleration information including the acceleration of the vehicle.

The yaw rate sensor is a detector that detects a yaw rate (rotation angular velocity) around a vertical axis passing through the center of gravity of the vehicle. For example, a gyro sensor is used as the yaw rate sensor. The yaw rate sensor outputs, to the ECU 10, yaw rate information including the yaw rate of the vehicle.

The steering sensor is a detector that detects a steering operation amount of a steering operation with respect to the steering wheel by the driver of the vehicle. The steering operation amount detected by the steering sensor is a steering angle of the steering wheel or a steering torque applied to the steering wheel, for example. The steering sensor is provided to a steering shaft of the vehicle, for example. The steering sensor outputs, to the ECU 10, information including the steering angle of the steering wheel or the steering torque applied to the steering wheel.

The accelerator pedal sensor is a detector that detects a stroke amount of an accelerator pedal. The stroke amount of the accelerator pedal is, for example, a pedal position of the accelerator pedal with respect to a reference position. The reference position may be a fixed position or a variable position depending on a predetermined parameter. The accelerator pedal sensor is provided to a shaft portion of the accelerator pedal of the vehicle, for example. The accelerator pedal sensor outputs, to the ECU 10, operation information depending on the stroke amount of the accelerator pedal.

The brake pedal sensor is a detector that detects a stroke amount of a brake pedal. The stroke amount of the brake pedal is, for example, a pedal position of the brake pedal with respect to a reference position. The reference position may be a fixed position or a variable position depending on a predetermined parameter. The brake pedal sensor is provided to a shaft portion of the brake pedal, for example. The brake pedal sensor may detect an operation force of the brake pedal (e.g. force on the brake pedal, oil pressure of a master cylinder, and so force). The brake pedal sensor outputs, to the ECU 10, operation information depending on the stroke amount or the operation force of the brake pedal.

In the example shown in FIG. 1, the map database 4 is a database including map information. The map database 4 is implemented, for example, in an HDD (Hard Disk Drive) installed in the vehicle. The map information includes road position information, road shape information, intersection position information, and fork position information, for example. The road shape information includes a road type such as a curve and a straight line, and a curvature of the curve. When the autonomous driving apparatus 100 uses a SLAM (Simultaneous Localization and Mapping) technology or position information of blocking structural objects such as buildings and walls, the map information may further include an output signal from the external sensor 1. As another example, the map database 4 may be constructed in a computer in a facility such as an information processing center with which the vehicle can communicate.

In the example shown in FIG. 1, the navigation system 5 is a device that guides the driver of the vehicle to a destination on the map designated by the driver of the vehicle. The navigation system 5 calculates a route in which the vehicle runs, based on the position information of the vehicle measured by the GPS reception unit 2 and the map information of the map database 4. The route may indicate a running lane in which the vehicle runs in a section having a plurality of lanes, for example. The navigation system 5 calculates a target route from the current position of the vehicle to the destination, and notifies the driver of the target route through a display and a speaker (audio output) for example. The navigation system 5 outputs, to the ECU 10, information of the target route for the vehicle. In the example shown in FIG. 1, the navigation system 5 uses the position information of the vehicle measured by the GPS reception unit 2 and the map information of the map database 4. In another example, the navigation system 5 may use information stored in a computer in a facility such as an information processing center with which the vehicle can communicate. A part of the processing executed by the navigation system 5 may be executed by the computer in the facility.

In the example shown in FIG. 1, the actuators 6 are devices that execute running controls of the vehicle. The actuators 6 include at least a throttle actuator, a brake actuator, and a steering actuator.

In the example shown in FIG. 1, the throttle actuator controls, in accordance with a control signal output from the ECU 10, an air amount supplied to an engine (i.e. throttle opening) to control a driving force of the vehicle. In another example where the vehicle is an electric vehicle, the actuators 6 may not include the throttle actuator but include a motor as a power source. A control signal is supplied from the ECU 10 to the motor, and thereby the driving force is controlled.

The brake actuator controls, in accordance with a control signal output from the ECU 10, a brake system to control a braking force applied to each wheel of the vehicle. For example, a hydraulic brake system can be used as the brake system.

The steering actuator controls, in accordance with a control signal output from the ECU 10, driving of an assist motor of an electric power steering system that controls the steering torque. Thus, the steering actuator controls the steering torque of the vehicle.

In the example shown in FIG. 1, the HMI 7 is an interface used for communicating information between an occupant (including the driver) in the vehicle and the autonomous driving apparatus 100. For example, the HMI 7 includes a display panel for displaying image information for the occupant, a speaker for outputting audio information, and operation buttons or a touch panel used by the occupant for performing an input operation. The HMI 7 may transmit the information to the occupant through a mobile information terminal connected wirelessly and receive the input operation by the occupant through the mobile information terminal.

In the example shown in FIG. 1, the driver status detection unit 8 detects a status of the driver by using, for example, a pressure sensor (not shown) attached to the steering wheel. More specifically, the driver status detection unit 8 detects a steering wheel grip strength of the driver. Furthermore, the driver status detection unit 8 detects a duration during which the steering wheel grip strength of the driver is equal to or more than a predetermined value.

Moreover, in the example shown in FIG. 1, the driver status detection unit 8 detects a status of an occupant (including the driver) in the vehicle by using, for example, a driver monitor camera. For example, the driver status detection unit 8 can check whether or not the driver has a strong driving intention. For example, when the driver status detection unit 8 detects distracted driving or drowsy driving, it is possible to determine that the driving intention of the driver is low. For example, when the driver status detection unit 8 detects that a direction of eyes of the driver does not change from a certain direction for more than a certain period of time, it is possible to determine that the driving intention of the driver is low.

Moreover, the driver status detection unit 8 can check whether or not safety of the occupant is high. For example, when the driver status detection unit 8 detects that the occupant does not wear a seat belt, it is possible to determine that the safety of the occupant is low. For example, the driver status detection unit 8 can detect whether or not the occupant wears the seat belt by using a sensor to detect whether or not a belt-side tongue plate and a buckle engage with each other. For example, when the driver status detection unit 8 detects that any door is opening, it is possible to determine that the safety of the occupant is low. For example, when the driver status detection unit 8 detects that the driver reclines a seat too much, it is possible to determine that the safety of the occupant is low. As an example, a reclining sensor provided to a power seat serves as the driver status detection unit 8 and detects that the driver reclines the seat too much. As another example, a pressure sensor installed in the seat serves as the driver status detection unit 8, and a reclining posture can be estimated based on a body pressure distribution detected by the pressure sensor.

In the example shown in FIG. 1, the auxiliary devices 50 include devices that can be operated by the driver of the vehicle. The auxiliary devices 50 include a collection of devices that are not included in the actuators 6. In the example shown in FIG. 1, the auxiliary devices 50 include a direction indicator, a headlight, a windshield wiper and the like.

In the example shown in FIG. 1, the ECU 10 (controller) executes the autonomous driving control of the vehicle. The ECU 10 has a CPU (Central Processing Unit), a ROM (Read Only Memory), a RAM (Random Access Memory) and the like. In the example shown in FIG. 1, the ECU 10 (controller) includes an acquisition unit 11, a recognition unit 12, a navigation plan generation unit 13, a calculation unit 14, a display unit 15, the control unit 16, the intervention determination unit 20, a continued-operation-intention estimation unit 21, and a determination condition management unit 22. In the ECU 10, a program stored in the ROM is loaded onto the RAM and executed by the CPU, and thereby controls by the acquisition unit 11 and the like are executed. The ECU 10 may consist of a plurality of electric control units.

In the example shown in FIG. 1, the acquisition unit 11 obtains the following operation amounts based on the information obtained by the internal sensor 3: the operation amounts of the steering operation, the acceleration operation, and the brake operation by the driver of the vehicle during the autonomous driving control; and the operation amounts of the steering operation, the acceleration operation, and the brake operation by the driver of the vehicle during the manual driving. As an example, the operation amounts are the steering angle of the steering wheel, the steering torque applied to the steering wheel, the stroke amount of the accelerator pedal, the stroke amount of the brake pedal, and the operation force of the brake pedal. As another example, the operation amounts are duration times during which the steering angle of the steering wheel, the steering torque applied to the steering wheel, the stroke amount of the accelerator pedal, the stroke amount of the brake pedal, and the operation force of the brake pedal are equal to or more than predetermined thresholds, respectively.

In the example shown in FIG. 1, the internal sensor 3 and the acquisition unit 11 serves as a "vehicle status detection unit". More specifically, the vehicle status detection unit can determine, based on a vehicle status obtained by the internal sensor 3 and the acquisition unit 11, whether or not the vehicle is in a stable state and whether or not a part of the vehicle is failed. For example, when the internal sensor 3 and the acquisition unit 11 detect that a VSC (Vehicle Stability Control) control is in execution, it is possible to determine that the vehicle is in an unstable state. For example, when the internal sensor 3 and the acquisition unit 11 detect that an ABS (Antilock Brake System) control is in execution, it is possible to determine that the vehicle is in an unstable state. For example, when the internal sensor 3 and the acquisition unit 11 detect that a TRC (TRaction Control) is in execution, it is possible to determine that the vehicle is in an unstable state. For example, when the internal sensor 3 and the acquisition unit 11 detect that a PCS (Pre-Crash Safety) is activated, it is possible to determine that the vehicle is in an unstable state. For example, when the internal sensor 3 and the acquisition unit 11 detect that an LDA (Lane Departure Alert) is activated, it is possible to determine that the vehicle is in an unstable state. For example, when the internal sensor 3 and the acquisition unit 11 detect a sudden acceleration, a sudden deceleration, or a zigzag driving of the vehicle, it is possible to determine that the vehicle is in an unstable state.

For example, when the ECU 10 recognizes failure or temporal defect of a part such as the external sensor 1, the GPS reception unit 2, and the internal sensor 3, it is possible to determine that the part of the vehicle is failed. For example, when the ECU 10 recognizes failure or temporal defect of a part such as the navigation system 5, the actuator 6, the HMI 7, and the auxiliary device 50, it is possible to determine that the part of the vehicle is failed. For example, when failure or temporal defect of the ECU 10 occurs, it is possible to determine that a part of the vehicle is failed. For example, when the ECU 10 recognizes decrease in a power-supply voltage supplied to components of the autonomous driving apparatus 100, it is possible to determine that a part of the vehicle is failed. For example, when an unstable state such as communication blackout occurs in a component of the autonomous driving apparatus 100, it is possible to determine that a part of the vehicle is failed.

In the example shown in FIG. 1, the recognition unit 12 recognizes an environment surrounding the vehicle, based on the information obtained by the external sensor 1, the GPS reception unit 2, and the map database 4. For example, the recognition unit 12 includes an obstacle recognition unit (not shown), a road width recognition unit (not shown), and a facility recognition unit (not shown). The obstacle recognition unit recognizes, based on the information obtained by the external sensor 1, obstacles surrounding the vehicle as the environment surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle means a property of the obstacle such as hardness and a shape of the obstacle. The road width recognition unit recognizes, based on the information obtained by the external sensor 1, the GPS reception unit 2, and the map database 4, a road width of a road in which the vehicle is running, as the environment surrounding the vehicle. The facility recognition unit recognizes, based on the map information obtained from the map database 4 and the vehicle position information obtained by the GPS reception unit 2, whether or not the vehicle is running in any of an intersection and a parking, as the environment surrounding the vehicle. The facility recognition unit may recognize, based on the map information and the vehicle position information, whether or not the vehicle is running in a school zone, near a childcare facility, near a school, or near a park, as the environment surrounding the vehicle.

In the example shown in FIG. 1, the recognition unit 12 serves as a "surrounding environment recognition unit". More specifically, based on the surrounding environment of the vehicle recognized by the recognition unit 12, it is possible to determine whether or not a risk of the surrounding environment of the vehicle is low. For example, when the recognition unit 12 recognizes that a TTC (Time To Collision) between the vehicle and a following vehicle, a preceding vehicle or a lateral vehicle is less than a predetermined value, it is possible to determine that the risk of the surrounding environment of the vehicle is high. For example, when the recognition unit 12 recognizes that the vehicle is close to a pedestrian, a bicycle or a motorcycle and the vehicle is likely to come into contact with the pedestrian, bicycle or motorcycle, it is possible to determine that the risk of the surrounding environment of the vehicle is high. For example, when the recognition unit 12 recognizes that the vehicle is running in a low-$\mu$ road, it is possible to determine that the risk of the surrounding environment of the vehicle is high.

In the example shown in FIG. 1, the navigation plan generation unit 13 generates a navigation plan (target track) for the vehicle, based on the target route calculated by the navigation system 5, the information on the obstacles surrounding the vehicle recognized by the recognition unit 12, and the map information obtained from the map database 4. More specifically, the navigation plan generation unit 13 generates a navigation plan for the vehicle carried out by the autonomous driving control. The navigation plan is a track of the vehicle in the target route. For example, the navigation plan includes a speed, an acceleration, a deceleration, a direction, and a steering angle of the vehicle at each time. The navigation plan generation unit 13 generates the navigation plan such that the vehicle runs on the target route while satisfying criteria of safety, legal compliance, a running efficiency and the like. Moreover, based on the situation of the obstacles surrounding the vehicle, the navigation plan generation unit 13 generates the navigation plan for the vehicle so as to avoid contact with the obstacles.

In the example shown in FIG. 1, the following thresholds are predetermined: a first threshold that is compared with the operation amount of the driving operation by the driver during the autonomous driving control, in order to determine whether or not the override occurs; a second threshold used for estimating whether or not the driver has a continued operation intention that is an intention to continue the manual driving, which will be described later; a third threshold which will be described later; and a threshold used for determining whether or not the autonomous driving control can be resumed (for example, an autonomous-driving-control resume prohibited period which will be described later). The calculation unit 14 can change the first threshold, the second threshold, the third threshold, and the threshold used for determining whether or not the autonomous driving control can be resumed, according to reliability of estimation of the vehicle position or reliability of recognition of the environment surrounding the vehicle (for example, the reliability becomes higher as a weather condition becomes better).

In the example shown in FIG. 1, the display unit 15 can display, on a display of the HMI 7, the first threshold which is compared with the operation amount of the driving operation by the driver during the autonomous driving control in order to determine whether or not the override occurs, and the like. More specifically, the display unit 15 can display, on the display of the HMI 7, the first threshold which is used for determining whether or not the override occurs during the autonomous driving control. Also, the display unit 15 can display, on the display of the HMI 7, the threshold used for determining whether or not the autonomous driving control can be resumed during the manual driving after the switching from the autonomous driving control to the manual driving is executed.

In the example shown in FIG. 1, the display unit 15 can notify the driver of a fact that the autonomous driving control is in execution and a fact that the autonomous driving control is not in execution. When the autonomous driving control is started or resumed, the display unit 15 displays, on the display of the HMI 7 for example, a fact that the autonomous driving control is in execution. When the switching from the autonomous driving control to the manual driving is executed, the display unit 15 displays, on the display of the HMI 7 for example, a fact that the autonomous driving control is not in execution (i.e. a fact that the manual driving is in execution).

In the example shown in FIG. 1, the control unit 16 automatically controls driving of the vehicle based on the navigation plan generated by the navigation plan generation unit 13. The control unit 16 outputs, to the actuators 6, control signals according to the navigation plan. That is, the control unit 16 controls the actuators 6 based on the navigation plan, and thereby the autonomous driving control of the vehicle is executed. Moreover, when the operation amount of the driving operation by the driver, which is obtained by the acquisition unit 11, becomes equal to or more than the first threshold in a period during which the autonomous driving control is in execution, that is, when the intervention determination unit 20 determines that the override occurs, the control unit 16 executes the switching from the autonomous driving control to the manual driving.

In the example shown in FIG. 1, the intervention determination unit 20 determines whether or not the override occurs. More specifically, as described above, when the operation amount of the driving operation (any of the steering operation, the acceleration operation, and the brake operation) by the driver of the vehicle during the autonomous driving control becomes equal to or more than the first threshold, the intervention determination unit 20 determines that the override has occurred.

In the example shown in FIG. 1, the continued-operation-intention estimation unit 21 estimates whether or not the driver has the continued operation intention that is an intention to continue the manual driving. More specifically, in the example shown in FIG. 1, a steering wheel grip strength of the driver is used in the estimation by the continued-operation-intention estimation unit 21. For example, the ECU 10 determines whether or not the steering wheel grip strength of the driver is equal to or more than the second threshold. Moreover, the ECU 10 determines whether or not a state where the steering wheel grip strength of the driver is equal to or more than the second threshold continues for a period equal to or more than the third threshold. When the state where the steering wheel grip strength of the driver is equal to or more than the second threshold continues for a period equal to or more than the third threshold, the continued-operation-intention estimation unit 21 estimates that the driver has the continued operation intention. More specifically, in the example shown in FIG. 1, the steering wheel grip strengths of the driver before and after the override occurrence are used for estimating whether or not the driver has the continued operation intention. Furthermore, a value obtained by adding a predetermined value to an average value of the steering wheel grip strength of the driver during the manual driving (that is, a usual steering wheel grip strength of the driver during the manual driving) is used as the second threshold. In other words, in the example shown in FIG. 1, when the ECU 10 determines that the driver does not temporarily but continuously grips the steering wheel with the steering wheel grip strength greater than the usual steering wheel grip strength during the manual driving, the continued-operation-intention estimation unit 21 estimates that the driver has the continued operation intention.

In the example shown in FIG. 1, the determination condition management unit 22 manages a determination condition (autonomous-driving-control resume determination condition) used for determining whether or not the autonomous driving control can be resumed after the switching from the autonomous driving control to the manual driving is executed.

In a case where the driver has an intention to continue the manual driving after the switching from the autonomous driving control to the manual driving is executed, the driver does not desire a resumption of the autonomous driving control. In view of this point, in the example shown in FIG. 1, the threshold used for determining whether or not the autonomous driving control can be resumed when the driver is estimated to have the continued operation intention is set to be larger than the threshold used for determining whether or not the autonomous driving control can be resumed when the driver is estimated not to have the continued operation intention. As a result, in the example shown in FIG. 1, the determination that the autonomous driving control can be resumed when the driver is estimated to have the continued operation intention is less likely to occur than the determination that the autonomous driving control can be resumed when the driver is estimated not to have the continued operation intention. That is, in the example shown in FIG. 1, the determination condition (first determination condition) used for determining that the autonomous driving control can be resumed when the driver is estimated to have the continued operation intention is set to be tighter than the determination condition (second determination condition) used for determining that the autonomous driving control can be resumed when the driver is estimated not to have the continued operation intention.

For example, in the example shown in FIG. 1, when the continued-operation-intention estimation unit 21 estimates that the driver has the continued operation intention, the ECU 10 determines that the autonomous driving control cannot be resumed. On the other hand, when the continued-operation-intention estimation unit 21 estimates that the driver does not have the continued operation intention and when the autonomous-driving-control resume determination condition is met, the ECU 10 determines that the autonomous driving control can be resumed.

Figure 2:
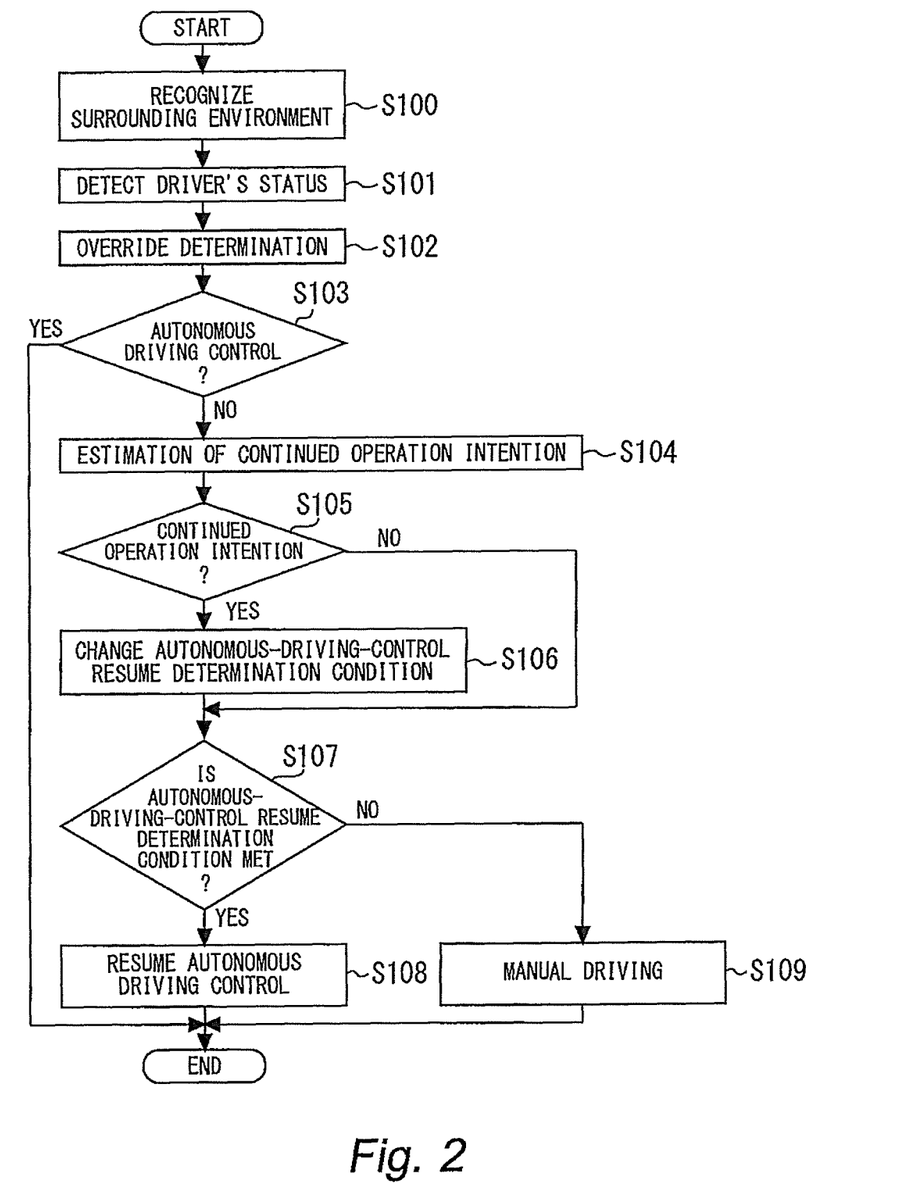
FIG. 2 is a flow chart for explaining a control for changing an autonomous-driving-control resume determination condition in the autonomous driving apparatus according to the first embodiment.

FIG. 2 is a flow chart for explaining a control for changing the autonomous-driving-control resume determination condition in the autonomous driving apparatus according to the first embodiment. After the routine shown in FIG. 2 is started, the recognition unit 12 (see FIG. 1) first recognizes the surrounding environment at Step S100. Subsequently, at Step S101, the driver status detection unit 8 (see FIG. 1) detects the status of the driver. Next, at Step S102, the intervention determination unit 20 (see FIG. 1) determines whether or not an override occurs. More specifically, as described above, when the operation amount of the driving operation (any of the steering operation, the acceleration operation, and the brake operation) by the driver of the vehicle during the autonomous driving control becomes equal to or more than the first threshold, the intervention determination unit 20 determines that the override has occurred. That is, at Step S102, whether or not the operation amount of the driving operation by the driver is equal to or more than the first threshold is determined by the intervention determination unit 20. When the intervention determination unit 20 determines that the override occurs, namely, the operation amount of the driving operation by the driver becomes equal to or more than the first threshold during the autonomous driving control, the control unit 16 (see FIG. 1) executes the switching from the autonomous driving control to the manual driving.

Next, at Step S103, whether the autonomous driving control is in execution or not is determined by the ECU 10 (see FIG. 1), for example. If "YES", then the routine ends. If "NO", then the process proceeds to Step S104. When the operation amount of the driving operation by the driver is equal to or more than the first threshold, the switching from the autonomous driving control to the manual driving is executed as described above, and thus the determination at Step S103 results in "NO". On the other hand, when the operation amount of the driving operation by the driver is less than the first threshold, the determination at Step S103 can be "YES" or "NO".

At Step S104, the continued-operation-intention estimation unit 21 (see FIG. 1) estimates whether or not the driver has the continued operation intention that is an intention to continue the manual driving. Subsequently, at Step S105, the ECU 10 (see FIG. 1) determines, based on the estimation result by the continued-operation-intention estimation unit 21, whether or not the driver has the continued operation intention. If it is determined that the driver has the continued operation intention, the process proceeds to Step S106. On the other hand, if it is determined that the driver does not have the continued operation intention, the process proceeds to Step S107. At Step S106, the determination condition management unit 22 (see FIG. 1) changes the determination condition (autonomous-driving-control resume determination condition). Specifically, the determination condition (first determination condition) for determining that the autonomous driving control can be resumed when the driver has the continued operation intention is set to be tighter than the determination condition (second determination condition) for determining that the autonomous driving control can be resumed when the driver does not have the continued operation intention. More specifically, at Step S106, the autonomous-driving-control resume determination condition is changed such that a determination at the following Step S107 will result in that the autonomous driving control cannot be resumed (i.e. the autonomous-driving-control resume determination condition is not met) when the continued-operation-intention estimation unit 21 estimates that the driver has the continued operation intention and the determination at Step S105 results in "YES". For example, when the continued-operation-intention estimation unit 21 estimates that the driver has the continued operation intention and the determination at Step S105 results in "YES", the autonomous-driving-control resume determination condition is changed at Step S106 such that an autonomous-driving-control resume prohibited period, which will be described later, is extended by an increment amount considering the continued operation intention.

Next, at Step S107, the ECU 10 (see FIG. 1) determines whether or not the autonomous-driving-control resume determination condition is met. If the determination at Step S107 results in "YES", the process proceeds to Step S108 and the ECU 10 resumes the autonomous driving control at Step S108. On the other hand, if the determination at Step S107 results in "NO", the process proceeds to Step S109 and the manual driving continues at Step S109. That is, when the determination at Step S105 results in "YES" and the autonomous-driving-control resume determination condition is changed to be tighter at Step S106, the autonomous-driving-control resume determination condition is less likely to be met and the determination is more likely to result in "NO" at Step S107. On the other hand, when the determination at Step S105 results in "NO" and Step S106 is not executed, the determination at Step S107 is more likely to result in "YES", as compared with the case where the determination at Step S105 results in "YES" and the autonomous-driving-control resume determination condition is changed to be tighter at Step S106. For example, when the determination at Step S105 results in "YES" (i.e. the driver is determined to have the continued operation intention) and the autonomous-driving-control resume determination condition is changed to be tighter at Step S106, the determination at Step S107 results in "NO", that is, it is determined that the autonomous driving control cannot be resumed.

As described above, in the example shown in FIG. 2, the autonomous-driving-control resume determination condition when the driver has the continued operation intention is changed at Step S106 to be tighter than the autonomous-driving-control resume determination condition when the driver does not have the continued operation intention. For example, the following processing is executed at Step S106. That is, an autonomous-driving-control resume prohibited period, which is a period from a time when the presence of the driving operation by the driver changes from "YES" to "NO" to a time when the resumption of the autonomous driving control is permitted, is extended (i.e. changed to be longer). This processing corresponds to changing the autonomous-driving-control resume determination condition tighter. In other words, in the case where the determination at Step S105 results in "YES" and the autonomous-driving-control resume determination condition is changed to be tighter at Step S106, the "longer" autonomous-driving-control resume prohibited period is used as one of the autonomous-driving-control resume determination condition at Step S107. On the other hand, in the case where the driver is estimated not to have the continued operation intention, the "shorter" autonomous-driving-control resume prohibited period is used as one of the autonomous-driving-control resume determination condition at Step S107.

Figure 3A:
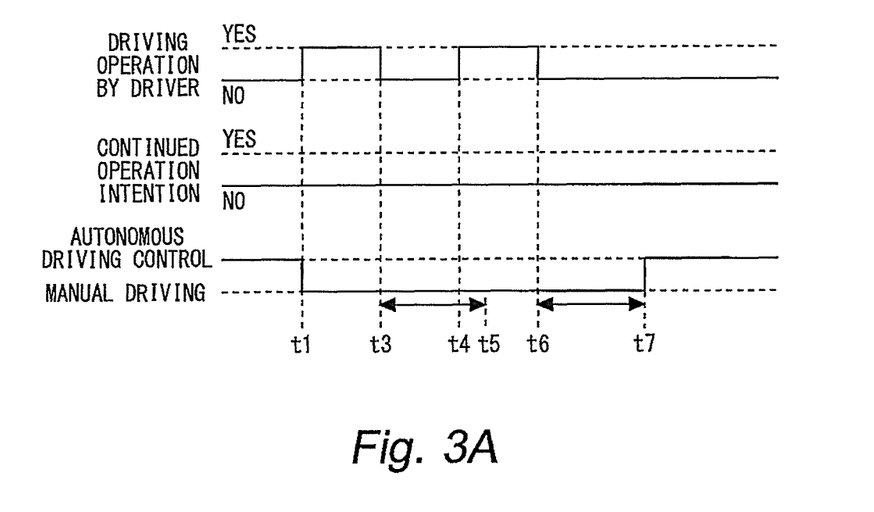
FIGS. 3A and 3B are timing charts for explaining examples to which the control for changing the autonomous-driving-control resume determination condition shown in FIG. 2 is applied.
Figure 3B:
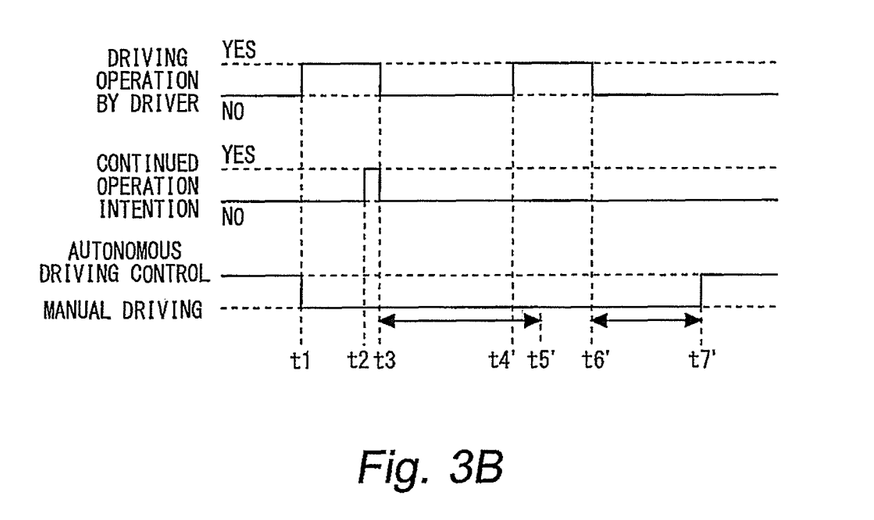

FIGS. 3A and 3B are timing charts for explaining examples to which the control for changing the autonomous-driving-control resume determination condition shown in FIG. 2 is applied. More specifically, FIG. 3A shows an example where the process of changing the autonomous-driving-control resume determination condition is not executed, while FIG. 3B shows an example where the process of changing the autonomous-driving-control resume determination condition is executed.

In the example shown in FIG. 3A, at a time t1, the presence of the driving operation by the driver changes from "NO" to "YES". More specifically, the operation amount of the driving operation by the driver becomes equal to or more than the first threshold at the time t1. As a result, the intervention determination unit 20 (see FIG. 1) determines that the override occurs, and the control unit 16 (see FIG. 1) executes the switching from the autonomous driving control to the manual driving. More specifically, in the example shown in FIG. 3A, the switching from the autonomous driving control to the manual driving is executed at the time t1, and then the determination at Step S103 (see FIG. 2) results in "NO", the determination at Step S105 (see FIG. 2) results in "NO", the determination at Step S107 (see FIG. 2) results in "NO", and thus Step S109 (see FIG. 2) is executed.

Next in the example shown in FIG. 3A, in a period from t1 to t3, the driver performs the driving operation and thus the manual driving is maintained. More specifically, in the example shown in FIG. 3A, in the period from t1 to t3, the determination at Step S103 (see FIG. 2) results in "NO", the determination at Step S105 (see FIG. 2) results in "NO", the determination at Step S107 (see FIG. 2) results in "NO", and thus Step S109 (see FIG. 2) is executed.

Next in the example shown in FIG. 3A, at the time t3, the presence of the driving operation by the driver changes from "YES" to "NO". More specifically, the operation amount of the driving operation by the driver becomes less than the first threshold at the time t3.

Even during the period when the driver desires the manual driving, the presence of the driving operation by the driver may temporarily change from "YES" to "NO". In another word, the driver may still desire the manual driving even after the presence of the driving operation by the driver changes from "YES" to "NO". In view of this point, according to the present embodiment, the autonomous-driving-control resume prohibited period, which is a period from the time when the presence of the driving operation by the driver changes from "YES" to "NO" to a time when the resumption of the autonomous driving control is permitted, is provided in order to avoid the switching from the manual driving to the autonomous driving control contrary to the driver's intention despite that the driver still desires the manual driving. In the example shown in FIG. 3A, a period from the time t3 when the presence of the driving operation by the driver changes from "YES" to "NO" to a time t5 when the resumption of the autonomous driving control is permitted is the autonomous-driving-control resume prohibited period. Therefore, in the example shown in FIG. 3A, in a period from t3 to t4 during the autonomous-driving-control resume prohibited period (from t3 to t5), the autonomous driving control is not resumed and the manual driving continues, although there is no driving operation by the driver. More specifically, in the example shown in FIG. 3A, in the period from t3 to t4, the determination at Step S103 (see FIG. 2) results in "NO", the determination at Step S105 (see FIG. 2) results in "NO", the determination at Step S107 (see FIG. 2) results in "NO", and thus Step S109 (see FIG. 2) is executed. That is, in the example shown in FIG. 3A, the determination condition management unit 22 (see FIG. 1) sets and manages the determination condition such that whether or not the autonomous driving control can be resumed is determined at the time t5 after the manual driving continues for a certain period of time after the time t3 when the operation amount of the driving operation by the driver becomes less than the first threshold.

Next in the example shown in FIG. 3A, at the time t4, the presence of the driving operation by the driver changes from "NO" to "YES". More specifically, the operation amount of the driving operation by the driver becomes equal to or more than the first threshold at the time t4. Since the manual driving has been performed from before the time t4, the switching from the autonomous driving control to the manual driving is not executed at the time t4. More specifically, in the example shown in FIG. 3A, at the time t4, the determination at Step S103 (see FIG. 2) results in "NO", the determination at Step S105 (see FIG. 2) results in "NO", the determination at Step S107 (see FIG. 2) results in "NO", and thus Step S109 (see FIG. 2) is executed.

Next in the example shown in FIG. 3A, in a period from t4 to t6, the driver performs the driving operation and thus the manual driving is maintained. More specifically, in the example shown in FIG. 3A, in the period from t4 to t6, the determination at Step S103 (see FIG. 2) results in "NO", the determination at Step S105 (see FIG. 2) results in "NO", the determination at Step S107 (see FIG. 2) results in "NO", and thus Step S109 (see FIG. 2) is executed.

Next in the example shown in FIG. 3A, at the time t6, the presence of the driving operation by the driver changes from "YES" to "NO". More specifically, the operation amount of the driving operation by the driver becomes less than the first threshold at the time t6.

In the example shown in FIG. 3A, a period from the time t6 when the presence of the driving operation by the driver changes from "YES" to "NO" to a time t7 when the resumption of the autonomous driving control is permitted is the autonomous-driving-control resume prohibited period. Therefore, in the example shown in FIG. 3A, in the autonomous-driving-control resume prohibited period from t6 to t7, the autonomous driving control is not resumed and the manual driving continues, although there is no driving operation by the driver. More specifically, in the example shown in FIG. 3A, in the period from t6 to t7, the determination at Step S103 (see FIG. 2) results in "NO", the determination at Step S105 (see FIG. 2) results in "NO", the determination at Step S107 (see FIG. 2) results in "NO", and thus Step S109 (see FIG. 2) is executed.

Next in the example shown in FIG. 3A, at the time t7, the autonomous-driving-control resume prohibited period (from t6 to t7) ends and the resumption of the autonomous driving control is permitted. As a result, at the time t7, the autonomous driving apparatus 100 resumes the autonomous driving control. More specifically, in the example shown in FIG. 3A, at the time t7, the determination at Step S103 (see FIG. 2) results in "NO", the determination at Step S105 (see FIG. 2) results in "NO", the determination at Step S107 (see FIG. 2) results in "YES", and thus Step S108 (see FIG. 2) is executed. That is, in the example shown in FIG. 3A, the determination condition management unit 22 (see FIG. 1) sets and manages the determination condition such that whether or not the autonomous driving control can be resumed is determined at the time t7 after the manual driving continues for a certain period of time after the time t6 when the operation amount of the driving operation by the driver becomes less than the first threshold.

In the example shown in FIG. 3B, at a time t1, the presence of the driving operation by the driver changes from "NO" to "YES". More specifically, the operation amount of the driving operation by the driver becomes equal to or more than the first threshold at the time t1. As a result, the intervention determination unit 20 (see FIG. 1) determines that the override occurs, and the control unit 16 (see FIG. 1) executes the switching from the autonomous driving control to the manual driving. More specifically, in the example shown in FIG. 3B, the switching from the autonomous driving control to the manual driving is executed at the time t1, and then the determination at Step S103 (see FIG. 2) results in "NO", the determination at Step S105 (see FIG. 2) results in "NO", the determination at Step S107 (see FIG. 2) results in "NO", and thus Step S109 (see FIG. 2) is executed.

Next in the example shown in FIG. 3B, in a period from t1 to t2, the driver performs the driving operation and thus the manual driving is maintained. More specifically, in the example shown in FIG. 3B, in the period from t1 to t2, the determination at Step S103 (see FIG. 2) results in "NO", the determination at Step S105 (see. FIG. 2) results in "NO", the determination at Step S107 (see FIG. 2) results in "NO", and thus Step S109 (see FIG. 2) is executed.

Next in the example shown in FIG. 3B, at the time t2, the continued-operation-intention estimation unit 21 (see FIG. 1) estimates that the driver has the continued operation intention that is an intention to continue the manual driving, and the ECU 10 (see FIG. 1) determines that there is the continued operation intention. As a result, the determination condition management unit 22 (see FIG. 1) changes the determination condition (autonomous-driving-control resume determination condition). Specifically, the determination condition (first determination condition) for determining that the autonomous driving control can be resumed when the driver has the continued operation intention is set to be tighter than the determination condition (second determination condition) for determining that the autonomous driving control can be resumed when the driver does not have the continued operation intention. More specifically, at the time t2 when the driver has the continued operation intention, Step S106 (see FIG. 2) is executed and the autonomous driving control is prohibited from being resumed. Furthermore, at Step S106 at the time t2, the extension processing is performed so that the autonomous-driving-control resume prohibited period, which is a period from a time (t3) when the presence of the driving operation by the driver changes from "YES" to "NO" to a time when the resumption of the autonomous driving control is permitted, is extended (changed) from a period from t3 to t5 (see FIG. 3A) to a period from t3 to t5' (see FIG. 3B). This extension processing corresponds to setting the autonomous-driving-control resume determination condition tighter. A difference between the period from t3 to t5' and the period from t3 to t5 corresponds to the increment amount considering the continued operation intention. In the example shown in FIG. 3B, at the time t2, the determination at Step S103 (see FIG. 2) results in "NO", the determination at Step S105 (see FIG. 2) results in "YES", Step S106 (see FIG. 2) is executed, the determination at Step S107 (see FIG. 2) results in "NO", and thus Step S109 (see FIG. 2) is executed.

Next in the example shown in FIG. 3B, in a period from t2 to t3, the continued-operation-intention estimation unit 21 (see FIG. 1) estimates that the driver has the continued operation intention that is an intention to continue the manual driving, and the ECU 10 (see FIG. 1) determines that there is the continued operation intention. As a result, the determination condition management unit 22 (see FIG. 1) sets the determination condition (autonomous-driving-control resume determination condition) such that the determination condition (first determination condition) for determining that the autonomous driving control can be resumed when the driver has the continued operation intention is tighter than the determination condition (second determination condition) for determining that the autonomous driving control can be resumed when the driver does not have the continued operation intention. More specifically, in the period from t2 to t3 when the driver has the continued operation intention, Step S106 (see FIG. 2) is executed and the autonomous driving control is prohibited from being resumed. Furthermore, at Step S106, the longer (post-change) autonomous-driving-control resume prohibited period from t3 to t5' is maintained. In the example shown in FIG. 3B, in the period from t2 to t3, the determination at Step S103 (see FIG. 2) results in "NO", the determination at Step S105 (see FIG. 2) results in "YES", Step S106 (see FIG. 2) is executed, the determination at Step S107 (see FIG. 2) results in "NO", and thus Step S109 (see FIG. 2) is executed.

Next in the example shown in FIG. 3B, at the time t3, the presence of the driving operation by the driver changes from "YES" to "NO" and the presence of the continued operation intention of the driver changes from "YES" to "NO". More specifically, at the time t3, the operation amount of the driving operation by the driver becomes less than the first threshold and the steering wheel grip strength of driver becomes less than the second threshold.

In the example shown in FIG. 3B, the autonomous-driving-control resume prohibited period is set to the longer period from the time t3 when the presence of the driving operation by the driver changes from "YES" to "NO" to the time t5' when the resumption of the autonomous driving control is permitted, as described above. Therefore, in the example shown in FIG. 3B, in a period from t3 to t4' during the autonomous-driving-control resume prohibited period (from t3 to t5'), the autonomous driving control is not resumed and the manual driving continues, although there is no driving operation by the driver. More specifically, in the example shown in FIG. 3B, in the period from t3 to t4', the determination at Step S103 (see FIG. 2) results in "NO", the determination at Step S105 (see FIG. 2) results in "NO", the determination at Step S107 (see FIG. 2) results in "NO", and thus Step S109 (see FIG. 2) is executed. That is, in the example shown in FIG. 3B, the determination condition management unit 22 (see FIG. 1) sets and manages the determination condition such that whether or not the autonomous driving control can be resumed is determined at the time t5' after the manual driving continues for a certain period of time after the time t3 when the operation amount of the driving operation by the driver becomes less than the first threshold.

Next in the example shown in FIG. 3B, at the time t4', the presence of the driving operation by the driver changes from "NO" to "YES". More specifically, the operation amount of the driving operation by the driver becomes equal to or more than the first threshold at the time t4'. Since the manual driving has been performed from before the time t4', the switching from the autonomous driving control to the manual driving is not executed at the time t4'. More specifically, in the example shown in FIG. 3B, at the time t4', the determination at Step S103 (see FIG. 2) results in "NO", the determination at Step S105 (see FIG. 2) results in "NO", the determination at Step S107 (see FIG. 2) results in "NO", and thus Step S109 (see FIG. 2) is executed.

Next in the example shown in FIG. 3B, in a period from t4' to t6', the driver performs the driving operation and thus the manual driving is maintained. More specifically, in the example shown in FIG. 3B, in the period from t4' to t6', the determination at Step S103 (see FIG. 2) results in "NO", the determination at Step S105 (see FIG. 2) results in "NO", the determination at Step S107 (see FIG. 2) results in "NO", and thus Step S109 (see FIG. 2) is executed.

More specifically, in the example shown in FIG. 3B, the longer autonomous-driving-control resume prohibited period (from t3 to t5') ends at the time t5'. At the time t5', restore processing may be performed so that the autonomous-driving-control resume prohibited period being an example of the autonomous-driving-control resume determination condition used in the determination at Step S107 (see FIG. 2) is restored (changed) from the longer autonomous-driving-control resume prohibited period from t3 to t5' (see FIG. 3B) to the shorter autonomous-driving-control resume prohibited period from t3 to t5 (see FIG. 3A).

Next in the example shown in FIG. 3B, at the time t6', the presence of the driving operation by the driver changes from "YES" to "NO". More specifically, the operation amount of the driving operation by the driver becomes less than the first threshold at the time t6'.

In the example shown in FIG. 3B, in a period from the time t5' when the autonomous-driving-control resume prohibited period (from t3 to t5') ends to the time t6' when the presence of the driving operation by the driver changes from "YES" to "NO", it is not determined at Step S105 (see FIG. 2) that the driver has the continued operation intention, and thus Step S106 (see FIG. 2) that changes the autonomous-driving-control resume determination condition is not executed. Therefore, at the time t6', the autonomous-driving-control resume prohibited period is the shorter period from the time t6' when the presence of the driving operation by the driver changes from "YES" to "NO" to a time t7' when the resumption of the autonomous driving control is permitted. As a result, in the example shown in FIG. 3B, in the autonomous-driving-control resume prohibited period from t6' to t7', the autonomous driving control is not resumed and the manual driving continues, although there is no driving operation by the driver. More specifically, in the example shown in FIG. 3B, in the period from t6' to t7', the determination at Step S103 (see FIG. 2) results in "NO", the determination at Step S105 (see FIG. 2) results in "NO", the determination at Step S107 (see FIG. 2) results in "NO", and thus Step S109 (see FIG. 2) is executed.

Next in the example shown in FIG. 3B, at the time t7', the shorter autonomous-driving-control resume prohibited period (from t6' to t7') ends and the resumption of the autonomous driving control is permitted. As a result, at the time t7', the autonomous driving apparatus 100 resumes the autonomous driving control. More specifically, in the example shown in FIG. 3B, at the time t7', the determination at Step S103 (see FIG. 2) results in "NO", the determination at Step S105 (see FIG. 2) results in "NO", the determination at Step S107 (see FIG. 2) results in "YES", and thus Step S108 (see FIG. 2) is executed. That is, in the example shown in FIG. 3B, the determination condition management unit 22 (see FIG. 1) sets and manages the determination condition such that whether or not the autonomous driving control can be resumed is determined at the time t7' after the manual driving continues for a certain period of time after the time t6' when the operation amount of the driving operation by the driver becomes less than the first threshold.

Figure 4:
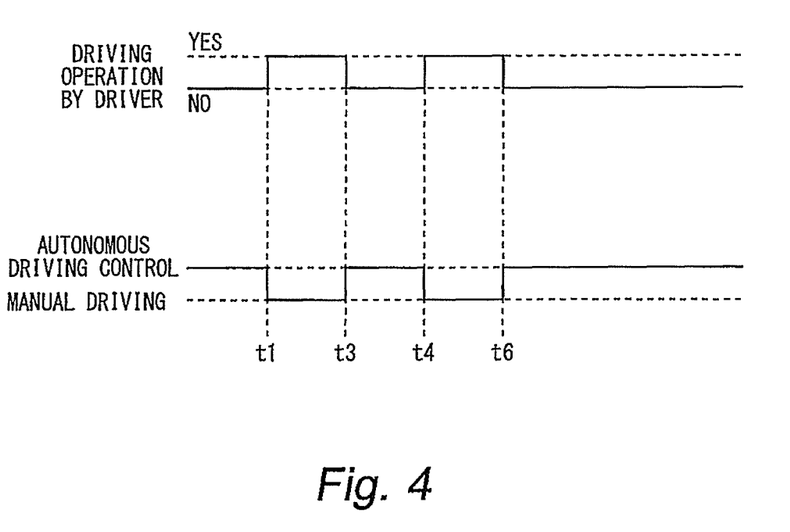
FIG. 4 is a timing chart for explaining a comparative example to which the control for changing the autonomous-driving-control resume determination condition shown in FIG. 2 is not applied.

FIG. 4 is a timing chart for explaining a comparative example to which the control for changing the autonomous-driving-control resume determination condition shown in FIG. 2 is not applied. In the example shown in FIG. 4, at a time t1, the presence of the driving operation by the driver changes from "NO" to "YES", it is determined that the override occurs, and the switching from the autonomous driving control to the manual driving is executed. Then, in a period from t1 to t3, the driver executes the driving operation, and thus the manual driving is maintained. Subsequently, at the time t3, the presence of the driving operation by the driver changes from "YES" to "NO".

More specifically, in the example shown in FIG. 4, no autonomous-driving-control resume prohibited period is provided. Therefore, even when the driver desires the manual driving, the switching from the manual driving to the autonomous driving control is executed contrary to the driver's intention at the time t3 when the presence of the driving operation by the driver changes from "YES" to "NO". Next in the example shown in FIG. 4, in a period from t3 to t4, the autonomous driving control is executed.

Next in the example shown in FIG. 4, at the time t4, the presence of the driving operation by the driver changes from "NO" to "YES", it is determined that the override occurs, and the switching from the autonomous driving control to the manual driving is executed. Then, in a period from t4 to t6, the driver executes the driving operation, and thus the manual driving is maintained. Subsequently, at the time t6, the presence of the driving operation by the driver changes from "YES" to "NO". At the time t6, even when the driver desires the manual driving, the switching from the manual driving to the autonomous driving control is executed contrary to the driver's intention, as in the case of the time t3.

According to the autonomous driving apparatus of the first embodiment, the autonomous-driving-control resume prohibited period is provided from t3 to t5, from t6 to t7 (see FIG. 3A), from t3 to t5', and from t6' to t7' (see FIG. 3B). It is therefore possible to suppress the possibility that the autonomous driving control is resumed contrary to the driver's intention after the switching from the autonomous driving control to the manual driving is executed as shown in FIG. 4 where the autonomous-driving-control resume prohibited period is not provided.

Moreover, according to the autonomous driving apparatus of the first embodiment, the first determination condition for determining that the autonomous driving control can be resumed when the driver is estimated to have the continued operation intention is set to be tighter than the second determination condition for determining that the autonomous driving control can be resumed when the driver is estimated not to have the continued operation intention. That is, according to the autonomous driving apparatus of the first embodiment, after the override is determined to occur and the switching from the autonomous driving control to the manual driving is executed, the autonomous driving control is less likely to be resumed in the case where the driver is estimated to have the continued operation intention than in the case where the driver is estimated not to have the continued operation intention.

According to the autonomous driving apparatus of the first embodiment, the determination condition for determining that the autonomous driving control can be resumed is set to be tighter in the period from t2 to t3 when the driver is estimated to have the continued operation intention as shown in FIG. 3B than in the period (e.g. after the time t7') when the driver is estimated not to have the continued operation intention. For example, the resumption of the autonomous driving control is prohibited. Therefore, in the case of the autonomous driving apparatus according to the first embodiment, it is possible to suppress the possibility that the autonomous driving control is resumed contrary to the driver's intention in the period from t2 to t3 when the driver has the continued operation intention, as compared with a case where the resumption of the autonomous driving control is not prohibited in the period from t2 to t3 when the driver has the continued operation intention.

Furthermore, according to the autonomous driving apparatus of the first embodiment, the determination condition for determining that the autonomous driving control can be resumed is set to be tighter in the case where the driver is estimated to have the continued operation intention (see FIG. 3B) than in the case where the driver is estimated not to have the continued operation intention (see FIG. 3A). More specifically, the autonomous-driving-control resume prohibited period is extended from the shorter period from t3 to t5 (see FIG. 3A) to the longer period from t3 to t5' (see FIG. 3B). Therefore, according to the autonomous driving apparatus of the first embodiment, when the driver is estimated to have the continued operation intention, it is possible to suppress the possibility that the autonomous driving control is resumed contrary to the driver's intention despite that the driver has the continued operation intention, as compared with the case where the autonomous-driving-control resume prohibited period is not extended.

Moreover, according to the autonomous driving apparatus of the first embodiment, when the state where the steering wheel grip strength of the driver detected by the driver status detection unit 8 (see FIG. 1) is equal to or more than the second threshold continues for a period equal to or more than the third threshold, the continued-operation-intention estimation unit 21 (see FIG. 1) estimates that the driver has the continued operation intention. In the example shown in FIG. 3B, based on the estimation result, the ECU 10 (see FIG. 1) determines that the driver has the continued operation intention in the period from t2 to t3. Therefore, in the case of the autonomous driving apparatus according to the first embodiment, it is possible to more precisely estimate whether or not the driver has the continued operation intention, as compared with a case where whether or not the driver has the continued operation intention is estimated without considering the steering wheel grip strength of the driver and the period when the driver grips the steering wheel.

According to the autonomous driving apparatus of the first embodiment, as described above, the control as shown in FIGS. 2, 3A, and 3B is executed when the autonomous driving control is resumed (that is, when the switching from the manual driving to the autonomous driving control is executed). On the other hand, when the autonomous driving control is first started in the autonomous driving apparatus according to the first embodiment, the following control is executed for example. That is, for example, the autonomous driving control is triggered by a driver's operation. More specifically, an ignition (not shown) of the vehicle is first turned ON. Subsequently, based on the environments surrounding the vehicle recognized by the external sensor 1 and the recognition unit 12 of the ECU 10, the control unit 16 determines whether or not the autonomous driving control can be started. When the autonomous driving control can be started, the control unit 16 uses the HMI 7 to notify the driver of the fact that the autonomous driving control can be started. Then, the driver performs a predetermined input operation by using the HMI 7. In response to that, the autonomous driving apparatus 100 starts the autonomous driving control.

In the example shown in FIG. 3B to which the autonomous driving apparatus according to the first embodiment is applied, the autonomous driving control is prohibited from being resumed during the period from t2 to t3 when the continued-operation-intention estimation unit 21 (see FIG. 1) estimates that the driver has the continued operation intention. In another example to which the autonomous driving apparatus according to the first embodiment is applied, it is also possible to determine that the autonomous driving control can be resumed if a certain condition is met, even in the period when the driver is estimated to have the continued operation intention. Here, the certain condition is set to be tighter in the case where the continued-operation-intention estimation unit 21 estimates that the driver has the continued operation intention than in the case where the continued-operation-intention estimation unit 21 estimates that the driver does not have the continued operation intention.

Second Embodiment

In the autonomous driving apparatus according to the first embodiment, the steering wheel grip strength of the driver is used for estimating, by the continued-operation-intention estimation unit 21 (see FIG. 1), whether or not the driver has the continued operation intention. In an autonomous driving apparatus according to a second embodiment, whether a successive override occurs is used, instead of the steering wheel grip strength of the driver or in addition to the steering wheel grip strength of the driver, for estimating, by the continued-operation-intention estimation unit 21, whether or not the driver has the continued operation intention. More specifically, in an example to which the autonomous driving apparatus according to the second embodiment is applied, an override (the operation amount of a driving operation by the driver becomes equal to or more than the first threshold during the autonomous driving control) occurs, and the switching from the autonomous driving control to the manual driving is executed. After that, following the override, the driver executes another driving operation whose operation amount is equal to or more than the first threshold, and then the continued-operation-intention estimation unit 21 estimates that the driver has the continued operation intention. In another example to which the autonomous driving apparatus according to the second embodiment is applied, when the driver successively executes driving operations whose operation amount is equal to or more than the first threshold immediately before the switching from the manual driving to the autonomous driving control is executed, the continued-operation-intention estimation unit 21 estimates that the driver has the continued operation intention. In still another example to which the autonomous driving apparatus according to the second embodiment is applied, when the driver successively executes driving operations whose operation amount is equal to or more than the first threshold immediately after the switching from the manual driving to the autonomous driving control is executed, the continued-operation-intention estimation unit 21 estimates that the driver has the continued operation intention.

Third Embodiment

In the autonomous driving apparatus according to the first embodiment, the steering wheel grip strength of the driver is used for estimating, by the continued-operation-intention estimation unit 21 (see FIG. 1), whether or not the driver has the continued operation intention. In an autonomous driving apparatus according to a third embodiment, an occurrence frequency of the override is used, instead of the steering wheel grip strength of the driver or in addition to the steering wheel grip strength of the driver, for estimating, by the continued-operation-intention estimation unit 21, whether or not the driver has the continued operation intention. More specifically, in an example to which the autonomous driving apparatus according to the third embodiment is applied, when the number of times of the override within a defined period of time is large, that is, when the occurrence frequency of the override is high, the continued-operation-intention estimation unit 21 estimates that the driver has the continued operation intention.

Fourth Embodiment

In the autonomous driving apparatus according to the first embodiment, the steering wheel grip strength of the driver is used for estimating, by the continued-operation-intention estimation unit 21 (see FIG. 1), whether or not the driver has the continued operation intention. In an autonomous driving apparatus according to a fourth embodiment, a steering speed is used, instead of the steering wheel grip strength of the driver or in addition to the steering wheel grip strength of the driver, for estimating, by the continued-operation-intention estimation unit 21, whether or not the driver has the continued operation intention. More specifically, in an example to which the autonomous driving apparatus according to the fourth embodiment is applied, when an amount of steering within a defined period of time is large, that is, when the steering speed is high, the continued-operation-intention estimation unit 21 estimates that the driver has the continued operation intention.

Fifth Embodiment

In the autonomous driving apparatus according to the first embodiment, the steering wheel grip strength of the driver is used for estimating, by the continued-operation-intention estimation unit 21 (see FIG. 1), whether or not the driver has the continued operation intention. In an autonomous driving apparatus according to a fifth embodiment, a frequency of change in a steering direction is used, instead of the steering wheel grip strength of the driver or in addition to the steering wheel grip strength of the driver, for estimating, by the continued-operation-intention estimation unit 21, whether or not the driver has the continued operation intention. More specifically, in an example to which the autonomous driving apparatus according to the fifth embodiment is applied, when the number of times of change in the steering direction within a defined period of time is large, that is, when the frequency of change in the steering direction is high, the continued-operation-intention estimation unit 21 estimates that the driver has the continued operation intention. In the case where whether or not the driver has the continued operation intention is estimated depending on the change in the steering direction, it is necessary to avoid an erroneous determination of occurrence of the change in the steering direction when the steering operation by the driver jiggles. For example, a threshold for determining whether or not the frequency of change in the steering direction is high is set to a remarkably higher value than a usual frequency of change in the steering direction, and thereby it is possible to avoid the erroneous determination of occurrence of the change in the steering direction when the steering operation by the driver jiggles.

Sixth Embodiment

In the autonomous driving apparatus according to the first embodiment, the steering wheel grip strength of the driver is used for estimating, by the continued-operation-intention estimation unit 21 (see FIG. 1), whether or not the driver has the continued operation intention. In an autonomous driving apparatus according to a sixth embodiment, a change in a situation in a direction of the driver's line of sight is used, instead of the steering wheel grip strength of the driver or in addition to the steering wheel grip strength of the driver, for estimating, by the continued-operation-intention estimation unit 21, whether or not the driver has the continued operation intention. More specifically, in an example to which the autonomous driving apparatus according to the sixth embodiment is applied, when a situation in a direction of the driver's gaze after an override occurs does not change from a situation in a direction of the driver's gaze before the override occurs, that is, when the driver continues to gaze at an unchanged situation over a period before and after the occurrence of the override, the continued-operation-intention estimation unit 21 estimates that the driver has the continued operation intention. Whether or not the driver gazes at the same object before and after the occurrence of the override is detected, for example, by using a driver monitor camera of the driver status detection unit 8 (see FIG. 1). The situation of the object (for example, a position of a vehicle, a pedestrian, and the like) at which the driver gazes is obtained through a variety of sensors of the external sensor 1 (see FIG. 1), communications, and the like.

Seventh Embodiment

In the autonomous driving apparatus according to the first embodiment, the steering wheel grip strength of the driver is used for estimating, by the continued-operation-intention estimation unit 21 (see FIG. 1), whether or not the driver has the continued operation intention. In an autonomous driving apparatus according to a seventh embodiment, a driver's concentration level is used, instead of the steering wheel grip strength of the driver or in addition to the steering wheel grip strength of the driver, for estimating, by the continued-operation-intention estimation unit 21, whether or not the driver has the continued operation intention. More specifically, in an example to which the autonomous driving apparatus according to the seventh embodiment is applied, when the driver's concentration level is higher than a threshold level, the continued-operation-intention estimation unit 21 estimates that the driver has the continued operation intention. For example, when high agility of the driver's motion is confirmed by using the driver monitor camera of the driver status detection unit 8 (see FIG. 1), the continued-operation-intention estimation unit 21 can determine that the driver's concentration level is high. As another example, based on a brain wave of the driver measured by a brain wave measurement device of the driver status detection unit 8, the continued-operation-intention estimation unit 21 can determine whether or not the driver's concentration level is high. In another example to which the autonomous driving apparatus according to the seventh embodiment is applied, when a state where the driver's concentration level is higher than a usual level continues over a period before and after the occurrence of the override, the continued-operation-intention estimation unit 21 estimates that the driver has the continued operation intention.

Eighth Embodiment

In the autonomous driving apparatus according to the first embodiment, the steering wheel grip strength of the driver is used for estimating, by the continued-operation-intention estimation unit 21 (see FIG. 1), whether or not the driver has the continued operation intention. In an autonomous driving apparatus according to an eighth embodiment, a motion of the driver's line of sight is used, instead of the steering wheel grip strength of the driver or in addition to the steering wheel grip strength of the driver, for estimating, by the continued-operation-intention estimation unit 21, whether or not the driver has the continued operation intention. More specifically, in an example to which the autonomous driving apparatus according to the eighth embodiment is applied, the continued-operation-intention estimation unit 21 estimates, based on the motion of the driver's line of sight, whether or not the driver has the continued operation intention. For example, the motion of the driver's line of sight is detected by using the driver monitor camera of the driver status detection unit 8 (see FIG. 1) or the like. For example, when the driver monitor camera of the driver status detection unit 8 detects that the driver turns the driver's graze to a plurality of particular directions alternately, the continued-operation-intention estimation unit 21 estimates that the driver has the continued operation intention.

Ninth Embodiment

In the examples shown in FIGS. 3A and 3B to which the autonomous driving apparatus according to the first embodiment is applied, the autonomous-driving-control resume prohibited period (from t3 to t5, from t6 to t7, from t3 to t5', or from t6' to t7') is used as the threshold for determining whether or not the autonomous driving control can be resumed. In an autonomous driving apparatus according to a ninth embodiment, the following is used instead of the autonomous-driving-control resume prohibited period, or in addition to the autonomous-driving-control resume prohibited period; that is, a travel distance of the vehicle after the time when the presence of the driving operation by the driver changes from "YES" to "NO" is used as the threshold for determining whether or not the autonomous driving control can be resumed. In the example shown in FIG. 3A, a travel distance of the vehicle after the time t3 is used as the threshold, for example. The travel distance as the threshold is an "autonomous-driving-control resume prohibited section". In an example to which the autonomous driving apparatus according to the ninth embodiment is applied, when the above-mentioned Step S106 (see FIG. 2) is executed to change the autonomous-driving-control resume determination condition, the autonomous-driving-control resume prohibited section is extended by an increment amount considering the continued operation intention. In the case where the autonomous-driving-control resume prohibited section is extended by the increment amount considering the continued operation intention, the vehicle is required to travel for a longer distance in order to resume the autonomous driving control, as compared with a case where the autonomous-driving-control resume prohibited section is not extended.

Tenth Embodiment

In the examples shown in FIGS. 3A and 3B to which the autonomous driving apparatus according to the first embodiment is applied, the autonomous-driving-control resume prohibited period (from t3 to t5, from t6 to t7, from t3 to t5', or from t6' to t7') is used as the threshold for determining whether or not the autonomous driving control can be resumed. In an autonomous driving apparatus according to a tenth embodiment, the following is used instead of the autonomous-driving-control resume prohibited period, or in addition to the autonomous-driving-control resume prohibited period; that is, the number of particular road characteristics (for example, signs, traffic signs, traffic lights, intersections, and the like) that the vehicle passes by after the time when the presence of the driving operation by the driver changes from "YES" to "NO" is used as the threshold for determining whether or not the autonomous driving control can be resumed. In the example shown in FIG. 3A, the number of the particular road characteristics that the vehicle passes by after the time t3 is used as the threshold, for example. The number of the particular road characteristics as the threshold corresponds to the "autonomous-driving-control resume prohibited section. In an example to which the autonomous driving apparatus according to the ninth embodiment is applied, when the above-mentioned Step S106 (see FIG. 2) is executed to change the autonomous-driving-control resume determination condition, the number of the particular road characteristics that the vehicle has to pass by is increased by an increment amount considering the continued operation intention. In the case where the number of the particular road characteristics that the vehicle has to pass by is increased by the increment amount considering the continued operation intention, the vehicle is required to travel for a longer distance in order to resume the autonomous driving control, as compared with a case where the number of the particular road characteristics that the vehicle has to pass by is not increased.

Eleventh Embodiment

In the examples shown in FIGS. 3A and 3B to which the autonomous driving apparatus according to the first embodiment is applied, the autonomous-driving-control resume prohibited period (from t3 to t5, from t6 to t7, from t3 to t5', or from t6' to t7') is used as the threshold for determining whether or not the autonomous driving control can be resumed. In an autonomous driving apparatus according to an eleventh embodiment, the following is used instead of the autonomous-driving-control resume prohibited period, or in addition to the autonomous-driving-control resume prohibited period; that is, a result of comparison regarding a track, a stop duration time, an operation amount, a speed and the like is used as the threshold for determining whether or not the autonomous driving control can be resumed. In an example to which the autonomous driving apparatus according to the eleventh embodiment is applied, when a difference between the target track (navigation plan) generated by the navigation plan generation unit 13 (see FIG. 1) and an actual track of the vehicle is less than a threshold, the resumption of the autonomous driving control is permitted. When the above-mentioned Step S106 (see FIG. 2) is executed to change the autonomous-driving-control resume determination condition, the threshold is decreased by a decrement amount considering the continued operation intention. That is, after the above-mentioned Step S106 is executed to change the autonomous-driving-control resume determination condition, the determination that the autonomous driving control can be resumed is less likely to be made. In another example to which the autonomous driving apparatus according to the eleventh embodiment is applied, when a stop duration time of the vehicle becomes equal to or more than a threshold, the resumption of the autonomous driving control is permitted. When the above-mentioned Step S106 (see FIG. 2) is executed to change the autonomous-driving-control resume determination condition, the threshold is increased by an increment amount considering the continued operation intention. That is, after the above-mentioned Step S106 is executed to change the autonomous-driving-control resume determination condition, the determination that the autonomous driving control can be resumed is less likely to be made.

In still another example to which the autonomous driving apparatus according to the eleventh embodiment is applied, when a difference between an operation amount of the driving operation (any of the steering operation, the acceleration operation, and the brake operation) provided to the driver by the autonomous driving apparatus 100 (see FIG. 1) and an actual operation amount by the driver is less than a threshold, the resumption of the autonomous driving control is permitted. When the above-mentioned Step S106 (see FIG. 2) is executed to change the autonomous-driving-control resume determination condition, the threshold is decreased by a decrement amount considering the continued operation intention. That is, after the above-mentioned Step S106 is executed to change the autonomous-driving-control resume determination condition, the determination that the autonomous driving control can be resumed is less likely to be made. In still another example to which the autonomous driving apparatus according to the eleventh embodiment is applied, when a difference between a target speed of the vehicle generated by the navigation plan generation unit 13 (see FIG. 1) and an actual speed of the vehicle is less than a threshold, the resumption of the autonomous driving control is permitted. When the above-mentioned Step S106 (see FIG. 2) is executed to change the autonomous-driving-control resume determination condition, the threshold is decreased by a decrement amount considering the continued operation intention. That is, after the above-mentioned Step S106 is executed to change the autonomous-driving-control resume determination condition, the determination that the autonomous driving control can be resumed is less likely to be made. In each of the above-described examples to which the autonomous driving apparatus according to the eleventh embodiment is applied, either an instantaneous value or an average value over a certain period of time may be used as the value compared with the corresponding threshold.

Twelfth Embodiment

The autonomous driving apparatus according to the first embodiment is not designed to resume the autonomous driving control when a position of an object on a running course or around the vehicle changes, such as when a target disappears from the running course. An autonomous driving apparatus according to a twelfth embodiment can be designed to resume the autonomous driving control when a position of an object on a running course or around the vehicle changes, such as when a target disappears from the running course.

Thirteenth Embodiment

In the autonomous driving apparatus according to the first embodiment, the autonomous driving control is not resumed when the running course, the speed or the like of the navigation plan in the autonomous driving control is changed during the manual driving. In an autonomous driving apparatus according to a thirteenth embodiment, the autonomous driving control can be resumed when the running course, the speed or the like of the navigation plan in the autonomous driving control is changed during the manual driving.

Fourteenth Embodiment

In the example shown in FIG. 2 to which the autonomous driving apparatus according to the first embodiment is applied, the above-described first threshold is not changed when Step S106 is executed. In an autonomous driving apparatus according to a fourteenth embodiment, the first threshold may be decreased when Step S106 is executed. After the first threshold is decreased, the operation amount of the driving operation by the driver is more likely to be equal to or more than the first threshold, and thus the determination that the override occurs is more likely to be made at Step S102. As shown in FIGS. 3A and 3B, when the operation amount of the driving operation by the driver is equal to or more than the first threshold (that is, when it is determined that there is the driving operation by the driver), the switching from the manual driving to the autonomous driving control is not executed. Therefore, it is possible by decreasing the first threshold to reduce the possibility that the autonomous driving control is resumed.

Fifteenth Embodiment

In a fifteenth embodiment of the autonomous driving apparatus according to the present disclosure, some of the first to fourteenth embodiments and examples of the autonomous driving apparatus according to the present disclosure described above can be combined with each other as appropriate.

What is claimed is:

1. An autonomous driving apparatus that executes an autonomous driving control of a vehicle,
the autonomous driving apparatus comprising a controller configure to:
determine whether or not an override occurs during the autonomous driving control, the override being defined as a condition that an operation amount of a driving operation by a driver becomes equal to or more than a first threshold;
execute, when the override is determined to occur, switching from the autonomous driving control to manual driving;
estimate whether or not the driver has a continued operation intention that is an intention to continue the manual driving; and
manage a determination condition used for determining whether or not the autonomous driving control can be resumed after the manual driving continues for a certain period of time after the operation amount of the driving operation by the driver becomes less than the first threshold,
wherein a first determination condition is the determination condition for determining that the autonomous driving control can be resumed, when the driver is estimated to have the continued operation intention after the switching from the autonomous driving control to the manual driving is executed,
a second determination condition is the determination condition for determining that the autonomous driving control can be resumed, when the driver is estimated not to have the continued operation intention after the switching from the autonomous driving control to the manual driving is executed, and
the first determination condition is less likely to be met than the second determination condition.

2. The autonomous driving apparatus according to claim 1, further comprising a driver status detection unit configured to detect a steering wheel grip strength of the driver,
wherein when a state where the steering wheel grip strength of the driver detected by the driver status detection unit is equal to or more than a second threshold continues for a period equal to or more than a third threshold, the controller estimates that the driver has the continued operation intention.

\* \* \* \* \*